United States Patent Office 3,534,071
Patented Oct. 13, 1970

---

3,534,071
17-OXYGENATED - 3 - ETHOXY - 6 - (DISUBSTITUTED AMINOMETHYL) PREGNA-3,5-DIEN-20-ONES AND ANALGESIC COMPOSITIONS
Charles R. Craig, 2040 Glenview Road, Morgantown, W. Va. 26505, and Paul B. Sollman, 1227 Van Voorhis Road, Wilmette, Ill. 60091
No Drawing. Filed Nov. 16, 1967, Ser. No. 683,472
Claims priority, application Great Britain, Dec. 6, 1966, 54,526/66
Int. Cl. C07c *169/32*
U.S. Cl. 260—397.4    11 Claims

ABSTRACT OF THE DISCLOSURE

Novel analgesic compositions containing, as the active ingredient, a 17 - oxygenated - 3 - ethoxy-6-(disubstituted aminomethyl)pregna-3,5-dien-20-one and novel 17-oxygenated 3-ethoxy-6-(disubstituted aminoethyl)pregna-3,5-dien-20-ones useful as analgesic agents.

---

The present invention is concerned with novel analgesic compositions containing as the active ingredient a 17-oxygenated - 3 - ethoxy - 6 - (disubstituted aminomethyl) pregna-3,5-dien-20-one of the following structural formula

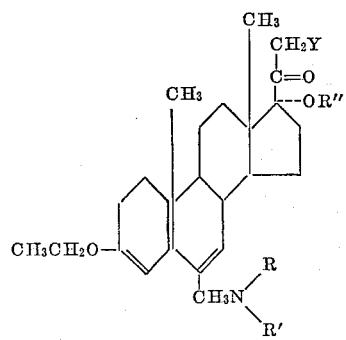

wherein R and R' can be a lower alkyl, lower alkanoyl or (lower alkanoyl) (lower alkylene) radical, Y can be hydrogen or a chloro, fluoro or acetoxy group, R" is a lower alkanoyl radical when Y is either hydrogen, chloro or fluoro and R" is either hydrogen or an acetoxy group when Y is an acetoxy group.

The lower alkyl radicals encompassed by R and R' are exemplified by methyl, ethyl, propyl, butyl, pentyl, hexyl, heptyl and the branched-chain groups isomeric therewith.

Typical of the lower alkylene radicals represented in that structural formula are methylene, ethylene, trimethylene, tetramethylene, pentamethylene and the corresponding branched-chain isomers.

The lower alkanoyl radicals denoted in that formula are, for example, formyl, acetyl, propionyl, butyryl, valeryl, caproyl, heptanoyl and the corresponding branched-chain groups.

The present invention is concerned also with novel analgesic 17-oxygenated-3-ethoxy-21-(optionally substituted)-6-(disubstituted aminomethyl)pregna-3,5-dien - 20-ones of the following structural formula

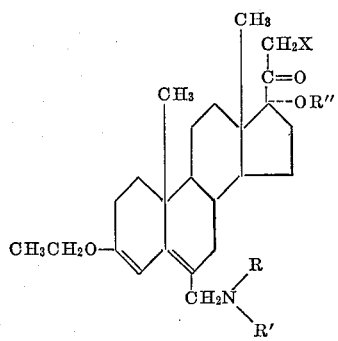

wherein R and R' are as defined above, X can be a chloro, fluoro, or acetoxy substituent, R" is acetyl when X is a chloro or fluoro substituent, R" is hydrogen or an acetyl radical when X is an acetoxy group, and also those of the following structural formula

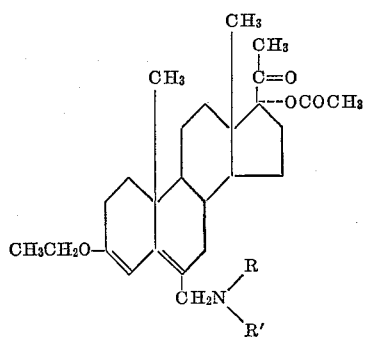

wherein R and R' are unidentical members selected from the group consisting of lower alkyl, lower alkanoyl and (lower alkanoyl) (lower alkylene) radicals.

The aforementioned 17-oxygenated-3-ethoxy-6-(disubstituted aminomethyl)pregna-3,5-dien-20-ones useful in view of their analgesic properties and represented by the following structural formula

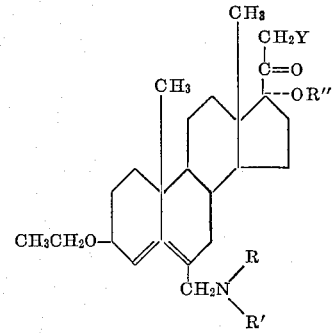

wherein R, R′, R″ and Y are as hereinbefore defined, are prepared from the corresponding 3-keto-Δ⁴ starting materials of the structural formula

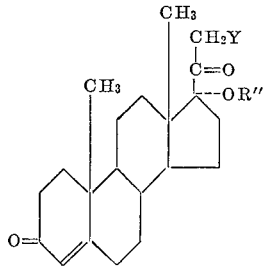

wherein R″ and Y are as above defined, by the methods described in U.S. Pat. 3,084,159, issued Apr. 2, 1963, and Burn et al., Tetrahedron, 21, 569 (1965). Those starting materials are thus contacted with ethyl orthoformate and ethanol in a suitable solvent such as dioxane in the presence of an acid catalyst such as p-toluene-sulfonic acid or sulfuric acid to afford the corresponding 3-ethyl enol ethers of the formula

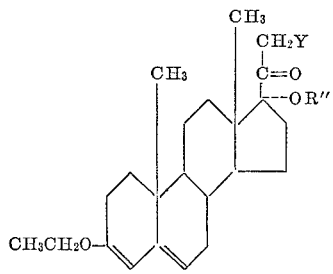

That process is exemplified by the reaction of 17α-acetoxy-21-fluoropregn-4-ene-3,20-dione in dioxane with ethyl orthoformate and ethanol in the presence of p-toluenesulfonic acid to afford 17α-acetoxy-3-ethoxy-21-fluoropregna-3,5-dien-20-one. Reaction of those 3-ethyl enol ethers with the Villsmeier reagent by the method described in the cited publications yields the desired 6-dialkylaminomethyl compounds. 17α-acetoxy-3-ethoxy-21-fluoropregna-3,5-dien-20-one is thus allowed to react with phosgene and dimethylformamide in methylene chloride and the resulting iminium intermediate is reduced with lithium borohydride to yield 17α-acetoxy-3-ethoxy-21-fluoro-6-dimethylaminomethylpregna-3,5-dien-20-one.

An alternate method for the preparation of the instant compounds involves reaction of the aforementioned 3-enol ethers with the Villsmeier reagent as described hereinbefore, followed by hydrolysis of the resulting iminium intermediate to yield the corresponding 6-formyl substances of the following formula

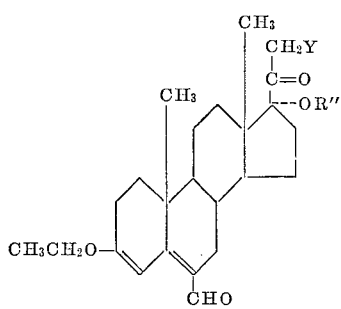

17α-acetoxy-3-ethoxypregna-3,5-dien-20-one is thus contacted with phosgene and dimethylformamide in ethylene dichloride and the resulting iminium intermediate is hydrolyzed with sodium acetate in aqueous methanol, thus producing 17α-acetoxy-3-ethoxy-6-formylpregna-3,5-dien-20-one. Those 6-formyl compounds are converted by reductive amination to the corresponding 6-alkylaminomethyl derivatives. When 17α-acetoxy-3-ethoxy-6-formylpregna-3,5-dien-20-one is shaken with methylamine in a hydrogen atmosphere in the presence of a palladium catalyst, 17α-acetoxy-3-ethoxy-6-methylaminomethylpregna-3,5-dien-20-one is produced. Conversion to the corresponding 6-dialkyl-aminomethyl compounds is conveniently effected by alkylation with the appropriate alkyl halide. Reaction of 17α-acetoxy-3-ethoxy-6-(N-ethyl-N-methylaminomethyl)pregna-3,5-dien-20-one with ethyl iodine in acetone thus affords 17α-acetoxy-3-ethoxy-6-(N-ethyl-N-methylaminomethyl) pregna-3,5-dien-20-one.

When the instant 6-alkylaminomethyl compounds are contacted with a lower alkanoic acid anhydride or halide, preferably in the presence of a suitable acid acceptor such as pyridine or triethylamine, the corresponding 6-(N-alkanoyl-N-alkylaminomethyl) derivatives are produced. 17α-acetoxy-3-ethoxy-6-methylaminomethylpregna-3,5-dien-20-one is thus converted to 17α-acetoxy-3-ethoxy-6-(N-acetyl-N-methylaminomethyl)pregna-3,5-dien-20-one by reaction with acetic anhydride in pyridine.

When a hydroxyalkylamine is used in the aforementioned reductive amination procedure, the corresponding 6-hydroxyalkylaminomethyl derivatives are produced. Acylation of the latter compounds with a lower alkanoic acid anhydride or halide according to the procedure hereinbefore described results in the 6-N-alkanoyl-N-alkanoyloxy-alkylaminomethyl) derivatives. These processes are specifically illustrated by the reaction of 17α-acetoxy-3-ethoxy-6-formylpregna-3,5-dien-20-one with 2-hydroxyethylamine in a hydrogen atmosphere, utilizing a 5% palladium-on-carbon catalyst and acylation of the resulting 6-(N-2-hydroxyethylaminomethyl) derivative with acetic anhydride in pyridine to afford 17α-acetoxy-3-ethoxy-6-(N-acetyl-N-2-acetoxyethylaminomethyl)pregna-3,5-dien-20-one.

The active ingredient for use in the novel compositions of this invention can be used in the form of the free amine or a pharmaceutically acceptable acid-addition or quaternary salt thereof. Those salts are readily produced by neutralization of the amine with the appropriate acid or by alkylation with an alkyl halide or sulfate. Specific examples are the hydrochloride, hydrobromide, sulfate, nitrate, phosphate, lactate, ascorbate, oxalate, succinate, maleate, tartrate, citrate, methochloride, methobromide, methiodide, methosulfate, ethiodide, ethosulfate, etc.

The novel compositions of this invention contain the active ingredients together with a pharmaceutically acceptable carrier. The concentration of active ingredient in the composition is not critical, but is preferably 1–80%. These compositions can be administered either orally or parenterally. For oral administration, tablets, lozenges, capsules, dragees, pills and powders are suitable while aqueous and non-aqueous solutions or suspensions are appropriate for parenteral administration. Acceptable pharmaceutical carriers are exemplified by gelatin capsules, sugars such as lactose or sucrose, starches such as corn starch or potato starch, cellulose derivatives such as sodium carboxymethyl cellulose, ethyl cellulose, methyl cellulose or cellulose acetate phthalate, gelatin, talc, calcium phosphates such as dicalcium phosphate or tricalcium phosphate, sodium sulfate, calcium sulfate, polyvinyl pyrrolidone, acacia, polyvinyl alcohol, stearic acid, alkaline earth metal stearates such as magnesium stearate, vegetable oil such as peanut oil, cottonseed oil, sesame oil, olive oil, corn oil and oil of theobroma, water, agar, alginic acid, benzyl alcohol, isotonic saline and phosphate buffer solution as well as other non-toxic compatible substances used in pharmaceutical formulations.

The method of this invention for producing an analgesic effect in mammals comprises the administration of an instant novel composition containing a therapeutically effective amount of the active ingredient. The term "theropeutically effective amount" is defined as the amount of active ingredient that will produce an analgesic effect, i.e. relieve pain. For a particular subject, the actual amount of active ingredient to be used will vary with the subject involved, the severity of the pain, the route of administration and the particular active ingredient used. The therapeutically effective amount of a particular active ingredient can be determined by comparing its potency with that of a known standard, for which the therapeutic dosage is known. The acive ingredients of this invention were thus tested and compared with known analgesics in the following assay, which is adapted from that described by Eckhardt et al., Proc. Soc. Exp. Biol. N.Y., 98, 186 (1958):

A group of 10 male and female mice of the Swiss-Webster strain is treated orally or subcutaneously with the selected dose of the test compound suspended in water with the aid of 10% gum acacia, while a similar group of 10 control mice is treated with the vehicle alone. One hour after treatment the animals are injected intraperitoneally with 0.2 ml. of a 0.5% aqueous hydrochloric acid solution. In control animals, the latter injection produces a peculiar "writhing syndrome," which is defined as a stretch, torsion to one side, drawing up of a hind leg, "sucking in" of the abdomen and slight opisthotonus so that the ventral surface of the mouse touches the floor. During the 15 minute period following administration of hydrochloric acid, the animals are observed for indication of the writhing syndrome. A compound is rated active if writhing is prevented in at least 20% of the animals. The $ED_{50}$ is defined as the dose which will prevent writhing in 50% of the animals.

The following results were obtained in the foregoing assay:

| Compound | $ED_{50}$ (mg. kg. body weight) | |
|---|---|---|
| | Oral | Subcutaneous |
| 17α-acetoxy-3-ethoxy-21-fluoro-6-dimethyl-aminomethylpregna-3,5-dien-20-one | 16 | |
| 17α-acetoxy-3-ethoxy-21-fluoro-6-dimethyl-aminomethylpregna-3,5-dien-20-one hydrochloride | 15 | 8.4 |
| 17α-acetoxy-3-ethoxy-6-dimethylaminomethyl-pregna-3,5-dien-20-one | 33 | 19 |
| 17α-acetoxy-21-chloro-3-ethoxy-6-dimethyl-amino-methylpregna-3,5-dine-20-one oxalate hemihydrate | | 27 |
| 17α-acetoxy-3-ethoxy-6-trimethylammonium-methyl-pregna-3,5-dien-20-one-iodide hemihydrate (disclosed in U.S. Pat. 3,228,933) | 27 | |
| 17α-acetoxy-3-ethoxy-6-(N-ethyl-N-methyl-aminomethyl)pregna-3,5-dine-20-one | 27 | |
| 21-acetoxy-3-ethoxy-17α-hydroxy-6-dimethyl-aminomethylpregna-3,5-dien-20-one | 41 | |
| 17α,21-diacetoxy-3-ethoxy-6-dimethyalmino-methylpregna-3,5-dien-20-one oxalate monohydrate | 35 | |
| 17α-acetoxy-3-ethoxy-6-(N-acetyl-N-methyl-aminomethyl)pregna-3,5-dine-20-one | 50 | |
| 17α-acetoxy-3-ethoxy-6-(N-acetyl-N-2-acetoxy-ethyl-aminomethyl)pregna-3,5-dien-20-one | 35 | |
| Morphine sulfate | 8.5 | 1.0 |
| Meperidine hydrochloride | | 24 |
| Codeine phosphate | | 31 |

It is thus seen from the foregoing data that 17α-acetoxy-3-ethoxy-21-fluoro-6-dimethylaminomethylpregna-3,5-dien-20-one hydrochloride, for example, possesses an $ED_{50}$ when administered orally of 15 mg. per kg. of body weight as compared to morphine sulfate which possesses an $ED_{50}$ of 8.5 mg. per kg. of body weight upon oral administration. It is apparent that the named amine hydrochloride is approximately ½ as potent as morphine sulfate, thus should be administered orally in twice the dosage to effect analgesia in a particular subject. 17α-acetoxy-3-ethoxy-21-fluoro-6-dimethylaminomethyl-pregna-3,5-dien-20-one hydrochloride, however, is surprisingly advantageous over morphine sulfate by virtue of the greater separation of analgesic and respiratory-depressant activities possessed by the former compound. That amine salt is, moreover, lacking in the addicting properties characteristic of morphine sulfate. The lack of addicting properties was determined by the failure of the named compound to suppress abstinence signs in morphine-dependent monkeys when administered subcutaneously at doses of 1, 2, 4, 8 and 16 mg. per kg. of body weight.

An especially preferred active ingredient of the present invention is 17α-acetoxy-3-ethoxy-21-fluoro-6-dimethyl-aminomethylpregna-3,5-dien-20-one together with the pharmaceutically acceptable salts thereof, in particular the aforementioned hydrochloride. The pronounced analgesic potency of that compound is extremely surprising in view of the lack of such activity in closely related compounds, i.e. the corresponding methyl, n-propyl and n-butyl enol ethers. That surprising and unexpected distinctive activity is demonstrated by data obtained from a modification of the aforementioned analgesic assay. In that modified assay, 7 pair of mice, one of each pair having been treated subcutaneously with the test compound, are observed by two naive observers and a conclusion as to the identity of the treated mouse is made. A compound is rated active if there are no more than 3 incorrect identifications of the total 14 observations, as a result which is statistically significant at the 0.05 level. The M.E.D. is defined as the minimum effective dose. In that assay the following data were obtained:

| Compound | M.E.D. (mg./kg. body weight) |
|---|---|
| 17α - acetoxy - 3 - ethoxy-21-fluoro - 6 - dimethylaminomethylpregna - 3,5 - dien - 20 - one hydrochloride | 1.25. |
| 17α - acetoxy - 3 - methoxy-21-fluoro - 6 - dimethylaminomethylpregna - 3,5 - dien - 20 - one oxalate monohydrate | Inactive at 50. |
| 17α - acetoxy - 3 - n - propoxy-21-fluoro - 6 - dimethylaminomethylpregna - 3,5 -dien - 20- one oxalate | Inactive at 50. |
| 17α - acetoxy - 3 - n - butoxy-21-fluoro - 6 - dimethylaminomethylpregna - 3,5 - dien - 20 - one oxalate | Inactive at 50. |
| 17α - n - butyroxy - 3 - ethoxy- 21 - fluoro - 6 - dimethylaminomethylpregna - 3,5 - dien-20-one oxalate | 50. |
| 17α - acetoxy - 3 - ethoxy-6-dimethylaminomethylpregna - 3, 5-dien-20-one | 15. |
| 17α - acetoxy - 3 - ethoxy - 6 - dimethylaminomethylpregna - 3, 5-dien-20-one hydrochloride | 12.5. |

When the above-described potencies are compared with the known clinically effective dose of morphine sulfate, i.e. 10–15 mg., it is apparent that the active ingredients of this invention should be administered at doses in the range of 20–1000 mg.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In those examples temperatures are given in degrees centigrade (° C.). Quantities of materials are expressed in parts by weight unless otherwise noted.

EXAMPLE 1

To a suspension of 25 parts of 17α-acetoxy-21-fluoropregn-4-ene-3,20-dione with 260 parts dioxane, 45 parts of ethyl orthoformate and 20 parts of anhydrous ethanol is added 0.5 part of p-toluenesulfonic acid. After 40 minutes, 5 parts of pyridine is added to the reaction mixture. The crude product is then precipitated by dilution with water and the resulting solid is isolated by filtration, then purified by trituration with ethanol containing a small amount of pyridine, thus affording 17α-acetoxy - 3-ethoxy-21-fluoropregna-3,5-dien-20-one, melting at about 122–135°.

EXAMPLE 2

When an equivalent quantity of 17α - acetoxy - 21-chloropregn-4-en-3,20-dione is substituted in the procedure of Example 1, there is produced 17α-acetoxy-21-chloro-3-ethoxypregna-3,5-dien-20-one, melting at about 110–118°.

EXAMPLE 3

The substitution of an equivalent quantity of 21-acetoxy-17α-hydroxypregn-4-ene-3,20-dione in the procedure of Example 1 results in 21-acetoxy-3-ethoxy-17α-hydroxypregna-3,5-dien-20-one, melting at about 155–160°.

EXAMPLE 4

By substituting an equivalent quantity of 17α,21-diacetoxypregn-4-ene-3,20-dione and otherwise proceeding according to the processes of Example 1, there is produced 17α,21-diacetoxy-3-ethoxypregna-3,5-dien-20-one, melting at about 110–115°.

EXAMPLE 5

To a cold mixture of 2.93 parts of antimony pentachloride with 11.6 parts of 1,1,2-trichlorotrifluoroethane is added 1.1 parts of n-butyryl chloride and the white mass which forms is dissolved, after 15 minutes, in 12.5 parts of nitromethane. To the resulting mixture is then added 1 part of 21-fluoro-17α-hydroxypregn-4-ene-3,20-dione and that reaction mixture is stored at 0–5° for about 30 minutes, then at room temperature for about 45 minutes. At the end of that time the mixture is poured into an aqueous solution consisting of 10 parts of sodium acetate in 20 parts of water and the resulting mixture is stirred for about 30 minutes. It is then extracted with chloroform and the chloroform layer is separated, washed with aqueous sodium bicarbonate, dried over anhydrous sodium sulfate and concentrated to afford, as an oil, 17α-n-butyroxy-21-fluoropregn-4-ene-3,20-dione.

When an equivalent quantity of 17α-n-butyroxy-21-fluoropregn-4-ene-3,20-dione is substituted in the procedure of Example 1, there is produced 17α-n-butyroxy-3-ethoxy-21-fluoropregna-3,5-dien-20-one, melting at about 90°.

EXAMPLE 6

The substitution of an equivalent quantity of 17α-acetoxypregn-4-ene-3,20-dione in the procedure of Example 1 result in 17α-acetoxy-3-ethoxypregna-3,5-dien-20-one, melting at about 138–148°.

To a cold solution of 18 parts of dimethylformamide in 75 parts of ethylene dichloride is added a solution of 12 parts of phosgene in 188 parts of ethylene dichloride. To the resulting mixture is then added a solution of 36 parts of 17α - acetoxy - 3-ethoxypregna-3,5-dien-20-one in 313 parts of ethylene dichloride containing 3 parts of pyridine. The resulting reaction mixture is allowed to warm to room temperature over a period of about 1½ hours, then is stirred for about 10 minutes with an aqueous solution containing 48 parts of sodium acetate in 900 parts of water. At the end of that time approximately 160 parts of methanol is added and stirring is continued for an additional 10 minutes. That mixture is then partitioned between water and ether and the ether layer is separated, washed with water, dried over anhydrous sodium sulfate and concentrated to dryness to afford an oily residue. Crystallization of that residue from acetone-pentane affords the crude product, melting at about 120–125°. Further purification by recrystallization from acetone-pentane yields 17α-acetoxy-3-ethoxy-6-formylpregna-3,5-dien-20-one, melting at about 123–127° with decomposition and exhibiting an ultraviolet absorption maximum at about 321.5 millimicrons with a molecular extinction coefficient of about 14,700.

EXAMPLE 7

To a solution of about 3 parts of dimethylformamide in about 130 parts of methylenechloride is added portionwise a solution of 1.5 parts of phosgene in 30 parts of methylene chloride and, after stirring for about 10 minutes, a solution of 3 parts of 17α-acetoxy-3-ethoxy-21-fluoropregna-3,5-dien-20-one in 40 parts of methylene chloride containing about 0.4 part of pyridine is added. There is added to that red solution, after about 10 minutes, a mixture of 0.4 part of lithium borohydride with 14 parts of tetrahydrofuran. The reaction mixture is then poured into water and the organic layer is separated, dried over anhydrous sodium sulfate, then evaporated to dryness to afford, as an oil, crude 17α-acetoxy-3-ethoxy-21 - fluoro - 6-dimethylaminomethylpregna-3,5-dien-20-one. The aqueous layer is concentrated to approximately ½ volume, then is cooled to induce crystallization of 17α-acetoxy - 3 - ethoxy - 21-fluoro-6-dimethylaminomethylpregna-3,5-dien-20-one borane, melting at about 235° with decomposition. This material is dissolved in pyridine and the resulting solution is heated at about 90° for about 2 hours, then is allowed to stand at room temperature for approximately 16 hours. Dilution of that solution with water results in precipitation of the crude product, which is collected by filtration and purified by recrystallization from aqueous ethanol to yield pure 17α-acetoxy-3-ethoxy-21 - fluoro - 6 - dimethylaminomethylpregna-3,5-dien-20-one, melting at about 152–153° and exhibiting an ultraviolet absorption maximum in methanol at about 252 millimicrons with a molecular extinction coefficient of about 21,000.

The latter amine is dissolved in anhydrous ether and an ethereal solution of isopropanolic hydrogen chloride is added. The precipitated salt is collected by filtration and dried, then recrystallized from aceton to afford 17α-acetoxy - 3 - ethoxy - 21-fluoro-6-dimethylaminomethylpregna-3,5-dien-20-one hydrochloride, melting at about 223–225° and displaying an ultraviolet absorption maximum at about 255 millimicrons with a molecular extinction coefficient of about 19,900.

EXAMPLE 8

To a solution of 1 part of 17α-acetoxy-3-ethoxy-6-dimethylaminomethylpregna-3,5-dien-20-one in 50 parts of ether is added excess ethereal hydrogen chloride and the resulting precipitate is collected by filtration and dried to afford 17α-acetoxy-3-ethoxy-6-dimethylaminomethylpregna-3,5-dien-20-one hydrochloride, melting at about 196–200° with decomposition and displaying an ultraviolet absorption maximum at about 254 millimicrons with a molecular extinction coefficient of about 19,200.

EXAMPLE 9

When an equivalent quantity of 17α-acetoxy-21-chloro-3-ethoxypregna-3,5-dien-20-one is substituted in the procedure of Example 7, there is produced 17α-acetoxy-21-chloro-3-ethoxy - 6 - dimethylaminomethylpregna - 3,5-dien-20-one. Reaction of that amine with oxalic acid affords 17α-acetoxy-21-chloro-3-ethoxy - 6 - dimethylaminomethylpregna-3,5 - dien - 20 - one oxalate hemihydrate, melting at about 175–178° with decomposition.

EXAMPLE 10

A solution of 6.7 parts of 17α-acetoxy-3-ethoxy-6-formylpregna-3,5-dien - 20 - one in about 200 parts of a 10% by volume solution of methylamine in anhydrous ethanol is shaken with hydrogen in the presence of 0.67 part of 5% palladium-on-charcoal catalyst at room temperature and about 3 atmospheres pressure until the uptake of hydrogen ceases. The catalyst is removed by filtration and the filtrate is stripped of solvent by distillation under reduced pressure to afford the crude product. Crystallization of that material from aqueous acetone yields 17α - 3 - ethoxy - 6 - methylaminomethylpregna- 3,5-dien-20-one, melting at about 157–158° and displaying an ultraviolet absorption maximum at about 253 millimicrons with a molecular extinction coefficient of about 20,500.

To a solution of 4.4 parts of 17α-acetoxy-3-ethoxy-6-methylaminomethylpregna-3,5-dien-20-one in acetone is added 0.8 part of ethyl iodide and that reaction mixture is allowed to stand at room temperature and pressure for about 1 hour. At the end of that time it is placed in a sealed reaction vessel and heated at approximately 58° for about 3 hours. Concentration of the resulting solution to dryness affords a residue, which is extracted with ether. To that ether solution is added oxalic acid and the resulting precipitate is collected by filtration to afford 17α - acetoxy-3-ethoxy - 6 - (N-ethyl-N-methyl-aminomethyl)pregna-3,5-dien-20-one oxalate. That material is dissolved in a mixture of ethanol and water, then neutralized with sodium bicarbonate. The resulting free amine is purified by recrystallization from aqueous acetone to yield pure 17α-acetoxy - 3 - ethoxy - 6 - (N-ethyl-N-methylaminomethyl)pregna - 3,5 - dien-20-one, melting at about 141–142° and displaying an ultraviolet absorption maximum at about 252.5 millimicrons with a molecular extinction of about 21,000.

EXAMPLE 11

A mixture containing 25 parts of 17α-acetoxy-6-methylaminomethylpregna-3,5-dien - 20 - one, 220 parts of acetic anhydride and 300 parts of pyridine is allowed to stand at room temperature for about 16 hours. At the end of that time the reaction mixture is concentrated to dryness to afford a residue, which is purified by recrystallization from acetone-hexane, thus yielding 17α-acetoxy - 3 - ethoxy - 6 - (N-acetyl-N-methylaminomethyl)pregna-3,5-dien-20-one, which melts at about 158–160° and displays an ultraviolet absorption maximum at about 250 millimicrons with a molecular extinction coefficient of about 21,400.

EXAMPLE 12

A mixture containing 7 parts of 17α-acetoxy-3-ethoxy-6-formylpregna-3,5-dien-20-one, 25 parts of 2-hydroxyethylamine, 160 parts of anhydrous ethanol and 0.7 part of 5% palladium-on-carbon catalyst is stirred with hydrogen at room temperature and about 3 atmospheres pressure until the uptake of hydrogen ceases. The catalyst is removed by filtration and the filtrate is partially concentrated, then diluted with water. The resulting precipitated product is dissolved in ether and oxalic acid is added, thus affording the crude oxalate, which is purified by recrystallization from anhydrous ethanol to yield 17α-acetoxy-3-ethoxy - 6 - (N-2-hydroxyethylaminomethyl)pregna-3,5-dien-20-one oxalate, melting at about 204–206°.

A solution containing 1.55 parts of 17α-acetoxy-3-ethoxy - 6 - (N-2-hydroxyethylaminomethyl)pregna-3,5-dien-20-one oxalate, 23 parts of pyridine and 25 parts of acetic anhydride is allowed to stand at room temperature for about 16 hours. At the end of that time the mixture is diluted with water and the resulting precipitate is collected by filtration and purified by recrystallization from ether-hexane to afford 17α-acetoxy-3-ethoxy-6-(N-acetyl-N - 2 - acetoxyethylaminomethyl)pregnan - 3,5-dien-20-one, melting at about 123–125° and exhibiting an ultraviolet absorption maximum at about 251 millimicrons with a molecular extinction coefficient of about 22,800.

EXAMPLE 13

By substituting an equivalent quantity of 17α,21-diacetoxy - 3 - ethoxypregna-3,5-dien-20-one in the procedure of Example 7, there is obtained, after reaction with oxalic acid, 17α,21-diacetoxy - 3 - ethoxy-6-dimethylaminomethylpregna-3,5-dien - 20 - one oxalate monohydrate, melting at about 110–120°.

EXAMPLE 14

When an equivalent quantity of 21-acetoxy-3-ethoxy-17α-hydroxypregna-3,5-dien-20-one is substituted in the procedure of Example 7, there is produced, after recrystallization from anhydrous ethanol containing a small quantity of pyridine, 21-acetoxy-3-ethoxy-17α-hydroxy-6-dimethylaminomethylpregna-3,5-dien-20-one which melts at about 195–197°.

EXAMPLE 15

When an equivalent quantity of 17α-n-butyroxy-3-ethoxy-21-fluoropregna - 3,5 - dien-20-one is substituted in the procedure of Example 7, there is produced 17α-n-butyroxy-3-ethoxy - 21 - fluoro-6-dimethylaminomethylpregna-3,5-dien-20-one as the oxalate salt, melting at about 148–150°.

EXAMPLE 16

When an equivalent quantity of diethylformamide is substituted for dimethylformamide in the procedure of Example 7, there is produced 17α-acetoxy-3-ethoxy-21-fluoro-6-diethylaminomethylpregna-3,5-dien-20-one.

EXAMPLE 17

When an equivalent quantity of propionic anhydride is substituted in the procedure of Example 11, there is produced 17α-acetoxy - 3 - ethoxy-6-(N-propionyl-N-methylaminomethyl)pregna-3,5-dien-20-one.

EXAMPLE 18

The substitution of an equivalent quantity of 3-hydroxypropylamine in the procedure of Example 12 affords 17α-acetoxy - 3 - ethoxy - 6 - (N-3-hydroxypropylaminomethyl)pregna-3,5-dien-20-one.

The substitution of equivalent quantities of 17α-acetoxy-3-ethoxy - 6 - (N-3-hydroxypropylaminomethyl)pregna-3,5-dien-20-one and propionic anhydride in the procedure described in Example 12 results in 17α-acetoxy-3-ethoxy-6-(N-propionyl-N - 3 - propionoxypropylaminomethyl)-pregna-3,5-dien-20-one.

EXAMPLE 19

A typical example of an analgesic composition containing an active ingredient of the present invention is indicated below.

10,000 tablets each containing 25 mg. of 17α-acetoxy-3 - ethoxy - 21 - fluoro-6-dimethylaminomethylpregna-3,5-dien-20-one are obtained by mixing intimately the components in the indicated amounts.

| Component A | Grams |
|---|---|
| 17α - acetoxy - 3 - ethoxy - 21 - fluoro-6-dimethylaminomethylpregna-3,5-dien-20-one hydrochloride | 2,500 |
| Lactose | 10,500–21,000 |
| Corn starch | 400–9,000 |
| Methyl cellulose | 300–900 |
| Component B | |
| Water | 3,700–6,000 |
| Component C | |
| Magnesium stearate | 120–500 |

To produce a powdered mixture, Component A are mixed thoroughly, comminuted, remixed, then granulated with Component B. The resulting mixture is screened, dried and screened again. Component C is then added and the entire mixture is thoroughly blended. The resulting mixture is compressed into tablets, each weighing roughly 200–300 mg. and containing 25 mg. of 17α-acetoxy-3-ethoxy-21-fluoro - 6 - dimethylaminomethylpregna-3,5-dien-20-one hydrochloride.

What is claimed is:
1. A compound of the formula

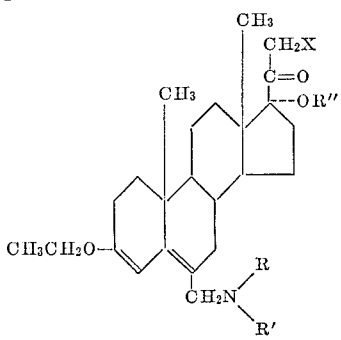

wherein R and R' are lower alkyl radicals, X is selected from the group of radicals consisting of chloro, fluoro and acetoxy, R'' is lower alkanoyl when X is chloro or fluoro and R'' is a member of the class consisting of hydrogen and acetyl when X is acetoxy.

2. As in claim 1, a compound of the formula

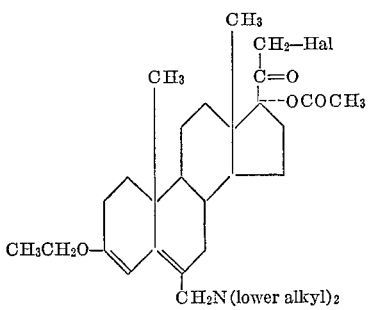

wherein Hal is selected from the group consisting of chloro and fluoro.

3. As in claim 1, a compound of the formula

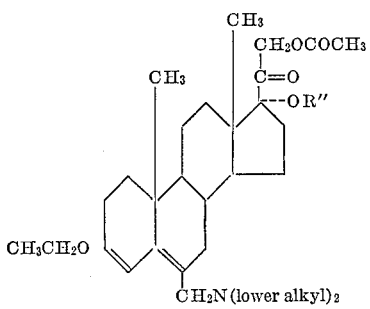

wherein R'' is selected from the group consisting of hydrogen and acetyl radicals.

4. As in claim 1, the compound which is 17α-acetoxy-21-chloro-3-ethoxy-6-dimethylaminomethylpregna-3,5-dien-20-one.

5. As in claim 1, the compound which is 17α-acetoxy-3-ethoxy-21-fluoro-6-dimethylaminomethylpregna-3,5-dien-20-one.

6. As in claim 1, the compound which is 21-acetoxy-3-ethoxy-17α-hydroxy-6-dimethylaminomethylpregna-3,5-dien-20-one.

7. As in claim 1, the compound which is 17α,21-diacetoxy-3-ethoxy-6-dimethylaminomethylpregna-3,5-dien-20-one.

8. As in claim 1, the compound which is 17α-acetoxy-3-ethoxy-21-fluoro-6-dimethylaminomethylpregna-3,5-dien-20-one hydrochloride.

9. A compound of the formula

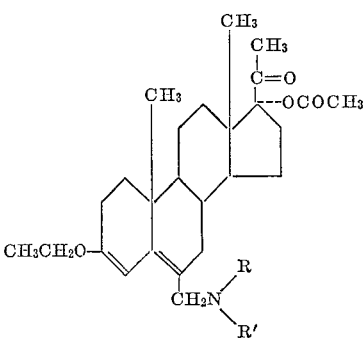

wherein R and R' are unidentical members selected from the group consisting of lower alkyl, lower alkanoyl and (lower alkanoyl)(lower alkylene) radicals.

10. As in claim 9, the compound which is 17α-acetoxy-3-ethoxy-6-(N-acetyl-N-methylaminomethyl)pregna-3,5-dien-20-one.

11. As in claim 9, the compound which is 17α-acetoxy-3-ethoxy-6-(N-acetyl-N-2-acetoxyethylaminomethyl)pregna-3,5-dien-20-one.

References Cited
UNITED STATES PATENTS
3,084,159  4/1963  Kirk et al. _____ 260—239.55
3,159,643  12/1964 Kirk et al. _____ 260—397.3
3,228,933  1/1966  Kirk et al. _____ 260—239.55

LEWIS GOTTS, Primary Examiner
E. G. LOVE, Assistant Examiner

U.S. Cl. X.R.
260—239.55, 397.47; 424—238